(12) United States Patent
Mestery et al.

(10) Patent No.: US 11,463,410 B2
(45) Date of Patent: Oct. 4, 2022

(54) CLOUD-NATIVE VPN SERVICE

(71) Applicant: Cisco Technology, Inc., San Jose, CA (US)

(72) Inventors: Kyle Mestery, Woodbury, MN (US); Grzegorz Boguslaw Duraj, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 68 days.

(21) Appl. No.: 16/845,753

(22) Filed: Apr. 10, 2020

(65) Prior Publication Data

US 2021/0136040 A1 May 6, 2021

Related U.S. Application Data

(60) Provisional application No. 62/928,391, filed on Oct. 31, 2019.

(51) Int. Cl.
*H04L 9/40* (2022.01)
*H04L 67/143* (2022.01)
*H04L 67/141* (2022.01)
*H04L 9/08* (2006.01)

(52) U.S. Cl.
CPC ......... *H04L 63/0272* (2013.01); *H04L 9/088* (2013.01); *H04L 67/141* (2013.01); *H04L 67/143* (2013.01)

(58) Field of Classification Search
CPC . H04L 63/0272; H04L 67/143; H04L 67/141; H04L 9/088
See application file for complete search history.

(56) References Cited

U.S. PATENT DOCUMENTS

| | | | |
|---|---|---|---|
| 8,223,770 B2 | 7/2012 | Wray et al. | |
| 9,712,440 B2 | 7/2017 | Koodli et al. | |
| 9,742,626 B2* | 8/2017 | Ramachandran | ....... H04L 47/32 |
| 9,942,200 B1* | 4/2018 | Tan | ...................... H04L 63/0272 |
| 10,601,779 B1* | 3/2020 | Matthews | ........... H04L 12/4633 |

(Continued)

OTHER PUBLICATIONS

WirelGuard: next generation kernel network tunnel, Jun. 30, 2018, Jason A. Donenfeld (Year: 2018).*

(Continued)

*Primary Examiner* — Michael A Keller
*Assistant Examiner* — Jsing Forng Lin
(74) *Attorney, Agent, or Firm* — Edell, Finnan & Shapiro, LLC

(57) ABSTRACT

Presented herein are techniques for establishing VPN services. According to example embodiments, an initial VPN message configured to establish a VPN session between the initiating device and a responding device is received at a VPN node. The initial VPN message is received from an initiating device. Data indicative of the initiating device and data indicative of the responding device is extracted from the initial VPN message. A VPN namespace is established to facilitate the VPN session between the initiating device and the responding device based on the data indicative of the initiating device and the data indicative of the responding device. One or more messages comprising data indicative of the VPN session are transmitted to a database.

20 Claims, 17 Drawing Sheets

(56) References Cited

U.S. PATENT DOCUMENTS

| | | | |
|---|---|---|---|
| 2006/0005204 A1* | 1/2006 | Siegel | G06F 16/25 719/313 |
| 2009/0037763 A1* | 2/2009 | Adhya | H04L 63/166 714/4.12 |
| 2011/0004913 A1 | 1/2011 | Nagarajan et al. | |
| 2013/0133061 A1* | 5/2013 | Fainkichen | G06F 9/45558 726/15 |
| 2017/0374025 A1* | 12/2017 | Pan | H04L 63/164 |
| 2020/0252201 A1* | 8/2020 | Sergeev | H04L 9/0618 |

OTHER PUBLICATIONS

Prince, Matthew, "WARP is here (sorry it took so long)", https://blog.cloudflare.com/announcing-warp-plus/, Sep. 25, 2019, 21 pages.

Prince, Matthew, "Introducing Warp: Fixing Mobile Internet Performance and Security", https://blog.cloudflare.com/1111-warp-better-vpn/, Apr. 1, 2019, 26 pages.

Edgesecurity, "WireGuard", https://www.wireguard.com/protocol/, downloaded Apr. 6, 2020, 9 pages.

Donenfeld, Jason A., "WireGuard: Next Generation Kernel Network Tunnel", www.wireguard.com, Jun. 30, 2018, 20 pages.

Gustavo Medina, Cisco TAC Engineer, "ASA VPN Load Balancing Master Election Process", Document ID:118078, https://www.cisco.com/c/en/us/support/docs/security/asa-5500-x-series-next-generation-firewalls/118078-technote-vpn-00.html, Aug. 1, 2014, 4 pages.

Cisco Systems, Inc., "CLI Book 1: Cisco ASA Series General Operations CLI Configuration Guide, 9.10", https://www.cisco.com/c/en/us/td/docs/security/asa/asa910/configuration/general/asa-910-general-config.html, Feb. 26, 2019, 1358 pages.

Cisco Systems, Inc., "CLI Book 3: Cisco ASA Series VPN CLI Configuration Guide, 9.10", https://www.cisco.com/c/en/us/td/docs/security/asa/asa910/configuration/vpn/asa-910-vpn-config.html, Apr. 24, 2019, 460 pages.

Kun Tan et al., "Protego: Cloud-Scale Multitenant IPsec Gateway", https://www.usenix.org/conference/atc17/technical-sessions/presentation/son, Jul. 12-14, 2017, 15 pages.

Cisco Systems, Inc., "Security for VPNs with IPsec Configuration Guide, Cisco IOS XE Release 3S", https://www.cisco.com/c/en/us/td/docs/ios-XML/ios/sec_conn_vpnips/configuration/xe-3s/sec-sec-for-vpns-w-ipsec-xe-3s-book/sec-cfg-vpn-ipsec.html, Sep. 2, 2018, 108 pages.

Cisco Systems, Inc., "VPN Availability Configuration Guide", Jul. 11, 2011, 48 pages.

Cisco Systems, Inc., "Setting General VPN Parameters", https://www.cisco.com/c/en/us/td/docs/security/asa/asa83/configuration/guide/config/vpnsysop.pdf, downloaded May 2, 2019, 18 pages.

Gross, J. et al., "Geneve: Generic Network Virtualization Encapsulation", Oct. 7, 2018, 29 pages.

\* cited by examiner

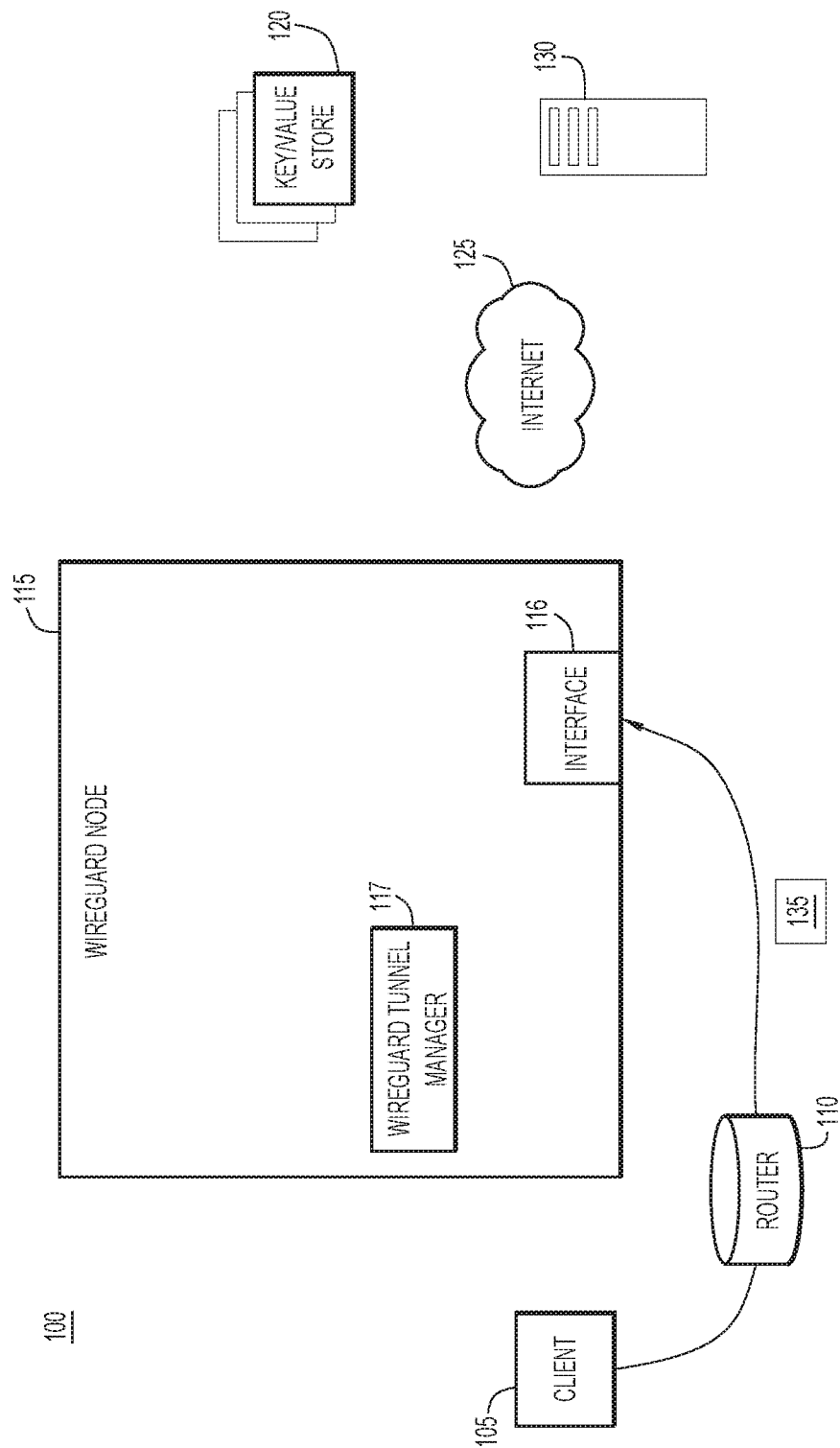

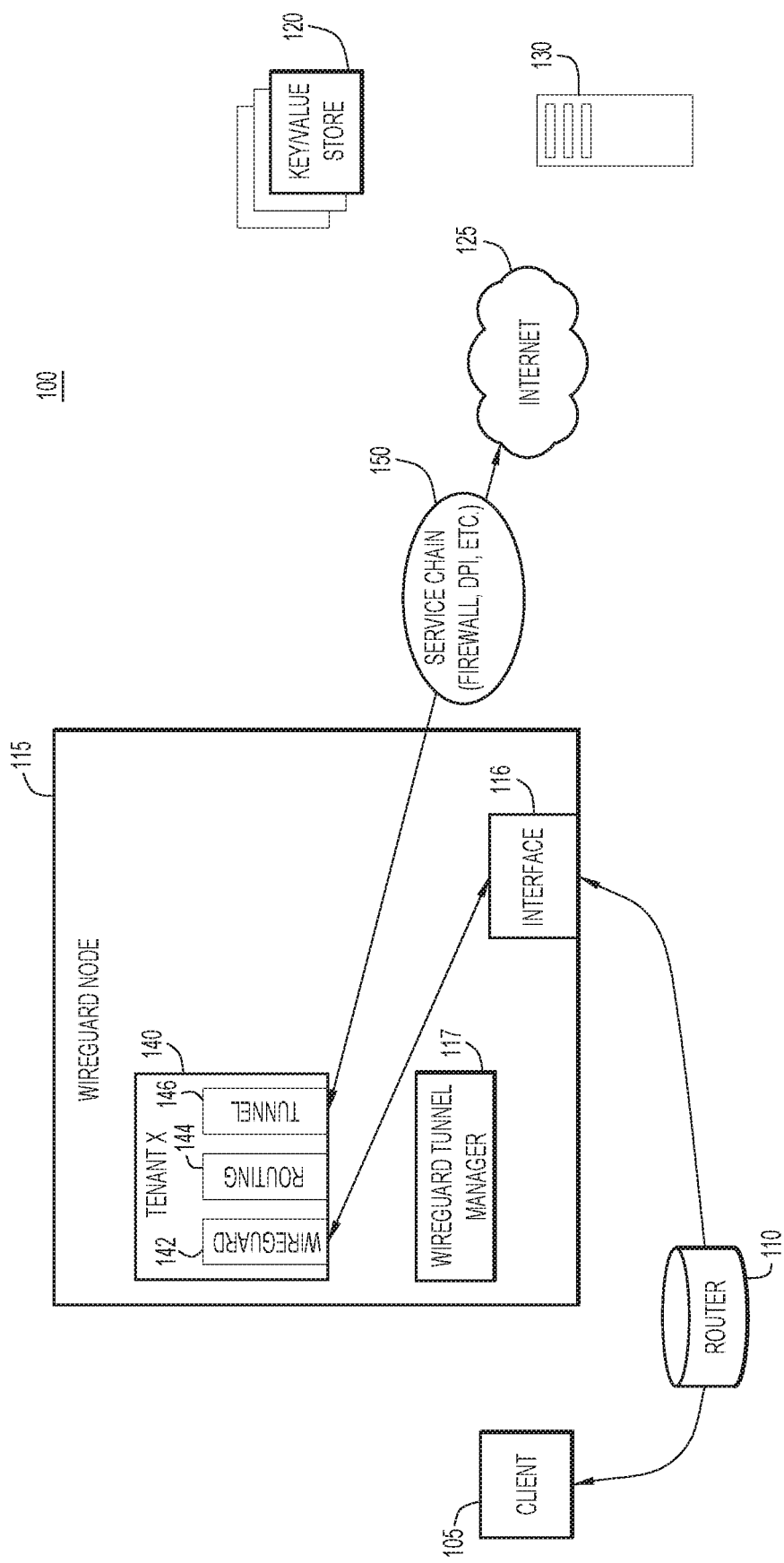

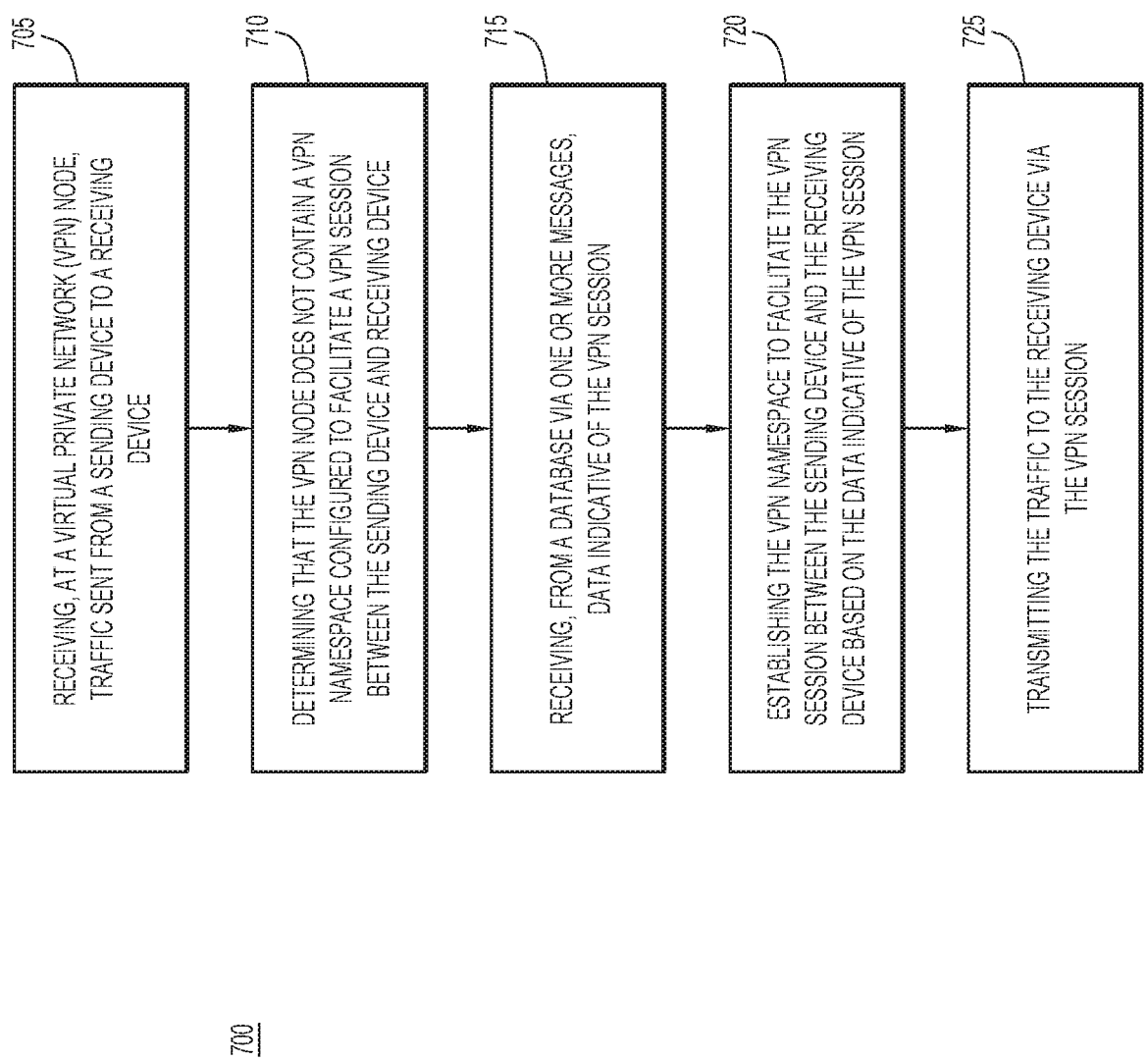

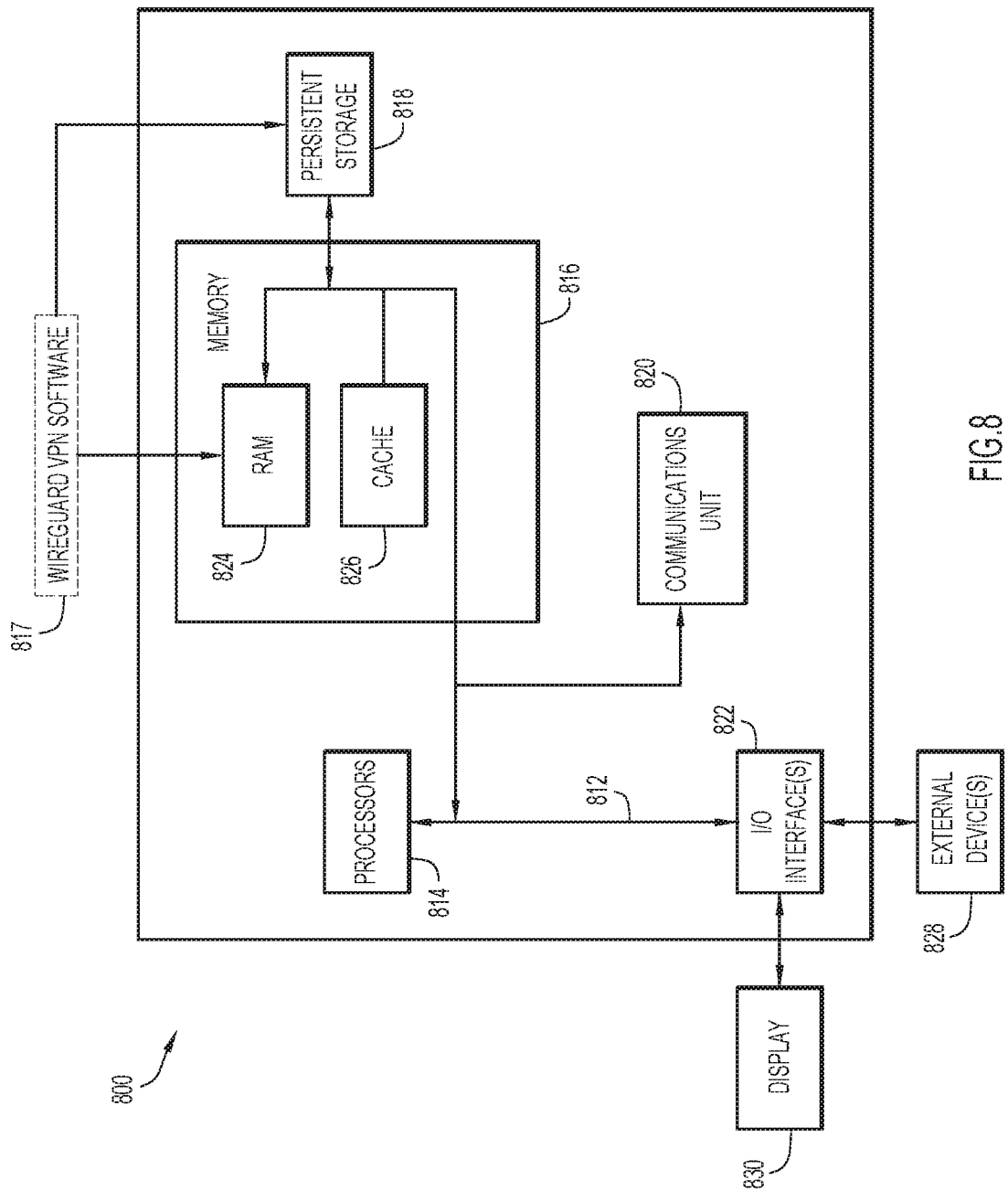

CLOUD-NATIVE VPN SERVICE

PRIORITY CLAIM

This application claims priority to U.S. Provisional Application No. 62/928,391, filed Oct. 31, 2019, the entirety of which is incorporated herein by reference.

TECHNICAL FIELD

The present disclosure relates to virtual private network (VPN) techniques.

BACKGROUND

VPN technology is useful technology for secure networking. One recently developed VPN technology, called WireGuard® VPN, is designed to be deployed in the Linux kernel. The WireGuard VPN technology uses a free and open-source software application and communication protocol that creates secure point-to-point connections in routed or bridged configurations. WireGuard is a User Datagram Protocol (UDP)-based protocol and provides simple VPN functionality. Accordingly, WireGuard was designed to be as "thin" as possible, allowing for simple peer-to-peer VPN connections to be enabled and set up. WireGuard may also serve as a long-term replacement for Internet Protocol Security (IPsec). A VPN connection, including those using WireGuard technology, may be achieved by exchanging very simple public keys.

BRIEF DESCRIPTION OF THE DRAWINGS

FIGS. 1A-1E illustrate an operational flow of a VPN session establishment process, according to example embodiments.

FIG. 7 illustrates a flowchart providing a process flow for recreating a VPN session, that has previously failed or been torn down, according to example embodiments.

FIG. 8 is a block diagram of a device configured to perform the operations presented herein, according to example embodiments.

DESCRIPTION OF EXAMPLE EMBODIMENTS

Overview

Figure 1B:
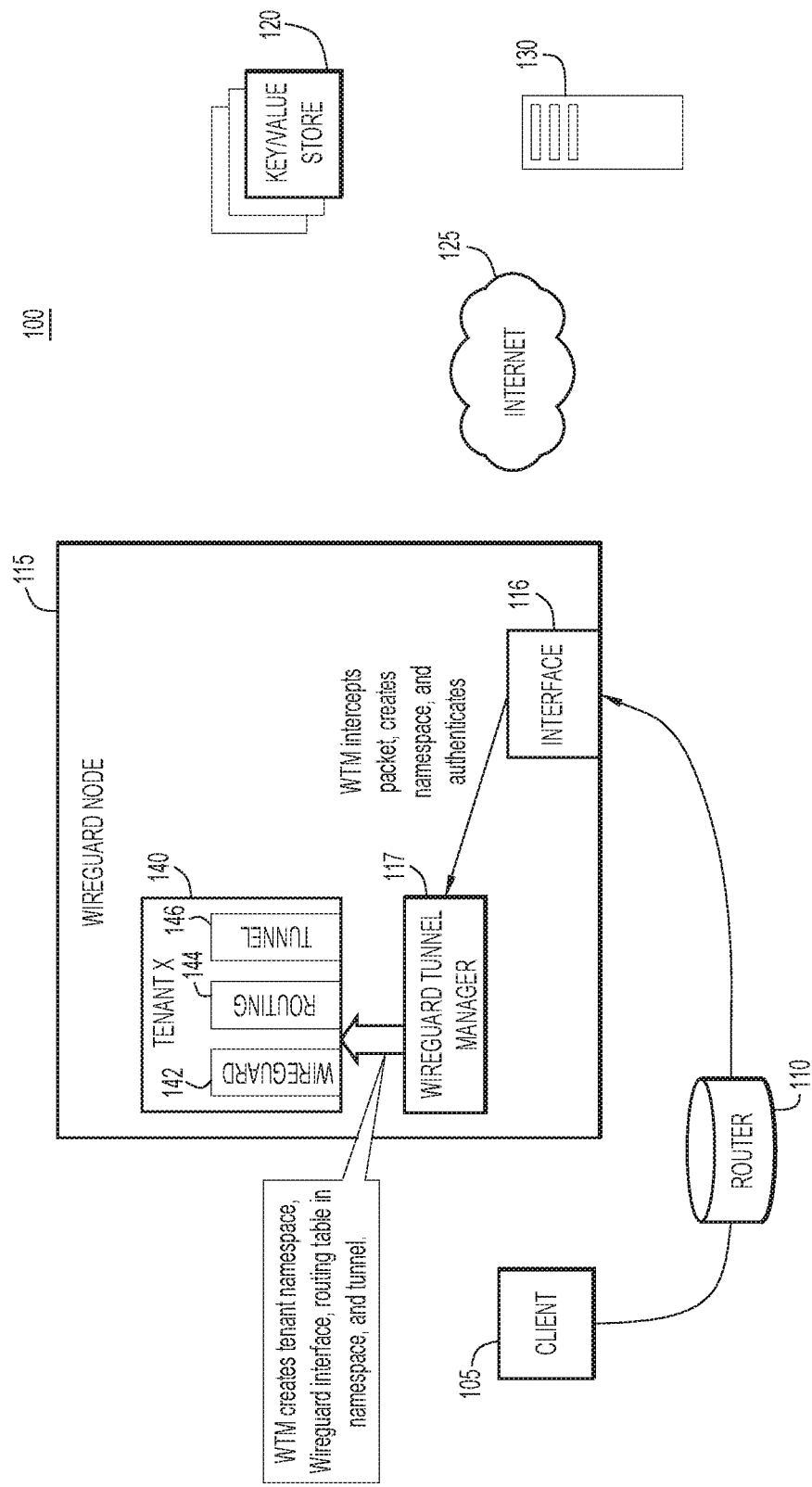

Presented herein are techniques for establishing VPN services. According to example embodiments, an initial VPN message configured to establish a VPN session between an initiating device and a responding device is received at a VPN node. The initial VPN message is received from the initiating device. Data indicative of the initiating device and data indicative of the responding device is extracted from the initial VPN message. A VPN namespace is established to facilitate the VPN session between the initiating device and the responding device based on the data indicative of the initiating device and the data indicative of the responding device. One or more messages comprising data indicative of the VPN session are transmitted to a database.

Example Embodiments

According to the techniques of the present disclosure, provided for herein is a highly distributed Virtual Private Network (VPN) head-end that may provide for key management, identity management, dynamic failover, and seamless uptime, when VPN nodes fail. The techniques of the present disclosure may also provide for dynamic failover and seamless uptime of the VPN head-end through the use of a database that is accessible by two or more VPN nodes. The database, which may be embodied as a high-speed, lightweight database such as a key/value store, contains information that allows a VPN node to create a namespace for implementation of a security association between sending and receiving devices.

For example, a VPN node receives an initiating packet and extracts data from the packet used to construct a VPN namespace for the traffic sent between an initiating device and a receiving device. The VPN node sends this information and other information used in the construction of the VPN namespace to the database, where it is stored. Should the VPN node tear down the VPN namespace due to, for example, a lapse in traffic sent using the VPN session, the VPN node may retrieve the data from the database to recreate the VPN namespace should the VPN node receive traffic to be transmitted via the previously torn down VPN session.

According to the other example embodiments, if the original VPN node fails or is otherwise removed from operation, a different VPN node that receives traffic intended for the no longer active VPN node may access the database, retrieve the data useful to construct the appropriate VPN namespace, and service the traffic with minimal or lessened downtime.

According to specific example embodiments, the techniques of the present disclosure may utilize the WireGuard VPN system. The techniques described herein are applicable to open source and standards-compatible versions of WireGuard, as well as proprietary and extended versions of WireGuard VPNs. A cloud-native, highly distributed VPN head-end can be designed that uses WireGuard, but absent the techniques of the present disclosure, related art systems may involve taking engineering simplicity and replacing it with operational complexity.

WireGuard tunnels make use of public/private key pairs. The identity of a peer is tied to the public key the peer uses. These keys are generated on each end of the tunnel, with the public keys distributed and used for authentication. A 32-bit value, akin to an IPsec Security Parameter Index (SPI), is also used. Initiating and responding devices (e.g., clients and servers) communicate using simple messages, and these devices may go dark for long periods of time (i.e., not communicate via the tunnel) and then communicating over the same channel at a later time. When building a cloud-native VPN service using WireGuard, the infrastructure around key management, identity management, dynamic failover, and seamless uptime, when nodes fail, may need to be accounted for.

A WireGuard VPN may also present a challenge when using Equal Cost Multi-Path (ECMP) networking. Because WireGuard clients will "roam" across local IP addresses, especially in the case of a mobile client going between a Wi-Fi® wireless local area network (WLAN) connection and a wireless wide area network (WWAN) cellular connection, it may be challenging to predictably use ECMP on the server side. Addressing this challenge may involve handling WireGuard connections "just-in-time," as described in greater detail below.

WireGuard, being a relatively simple protocol, may make it more difficult to associate a connection with a user, something that may be important in specific WireGuard VPN implementations. WireGuard is designed to operate with a number of different types of devices, not specifically for use with mobile devices, but the techniques of the present disclosure in combination with WireGuard may be particularly applicable to environments in which mobile devices, such as smartphones, tablets, laptops and other mobile computing devices, utilize WireGuard to communicate securely. Applying the techniques of the present disclosure to WireGuard implementations may provide "just-in-time" dynamic VPN head-end services without requiring changes to the WireGuard protocol. Furthermore, there may be no need to separate the control plane and data plane when providing a VPN head-end service that supports the WireGuard protocol.

With reference now made to FIG. 1A, depicted therein is a network environment 100 configured to implement the techniques of the present disclosure. Included in environment 100 are an initiating device 105 (also referred to as a "client device"), a router 110, a VPN node 115, and a key/value store 120 or database. VPN node 115 will allow initiating device 105 to access responding device 130 (also referred to as a "server") via Internet 125 using the VPN services provided by VPN node 115. According to the specific example embodiment of FIG. 1A, VPN node 115 is embodied as a WireGuard node, and may be referred to as such in the following description. WireGuard node 115 may be a standalone physical server or a virtual machine. Furthermore, WireGuard node 115 includes an interface 116 and a WireGuard tunnel manager (WTM) 117. WireGuard node 115 serves as a Hybrid Anycast WireGuard VPN endpoint. Interface 116 may be embodied as a virtual interface when, for example, Wireguard node 115 is embodied as a virtual machine, or as a physical interface when, as a further example, Wireguard node 115 is embodied as a physical device, such as a standalone server.

As illustrated in FIG. 1A, WireGuard node 115 is not yet executing a namespace associated with providing VPN services to initiating device 105. The following description made in conjunction with FIGS. 1A-E will illustrate a process by which a namespace provides VPN services to initiating device 105 according to the techniques of the present disclosure.

The process illustrated in FIGS. 1A-1E begins when initiating device 105 sends packet 135. Packet 135 is the first packet sent from initiating device 105 to responding device 130, and therefore, packet 135 is configured to initiate a Wireguard handshake. Accordingly, packet 135 includes the structure and fields illustrated in FIG. 2. As illustrated in FIG. 2, packet 135 includes an Internet Protocol (IP) header 205, a User Datagram Protocol (UDP) header 210 and a WireGuard message portion 215.

While numerous values are contained in the IP header 205 and the UDP header 210, the important values for the present disclosure are the protocol field 206, the source IP address 207 and the destination IP address 208 of the IP header 205, and the source port 211 and the destination port 212 of the UDP header 210. These five values, referred to as a "5-tuple," serve as a "fingerprint" to identify the VPN session that is established for the initiating device 105.

As illustrated in FIG. 2, the WireGuard message portion 215 includes a message type field 216 (which at this point of the exchange indicates a handshake initiation message), a reserved field 217, a sender index field 218 (which will be a receiver index in packets sent from the receiver, such as responding device 130 of FIG. 1), an unencrypted ephemeral field 219 (which at this point of the exchange contains the public key associated with the WireGuard VPN session being created), an encrypted static field 220 (which at this point of the exchange contains the private key associated with WireGuard VPN session being created), an encrypted timestamp 221, and two Message Authentication Code (MAC) values 222 and 223 (which are used in authentication and preventing distributed denial of service attacks). MAC values 222 and 223 may change frequently, and may serve a similar function to message identifiers in IPsec.

WireGuard uses public and private keys to authenticate the client device (e.g., initiating device 105) and establish the WireGuard session. According to the present example embodiment, initiating device 105 generates the public/private key pair and includes it in packet 135. According to other example embodiments, the public/private key pair may be generated elsewhere, such as at WireGuard node 115, a key server, an authentication server, or another device known to the skilled artisan. The client device (e.g., initiating device 105) stores the public key in its security profile account (an example of which could be an account with the Cisco® Umbrella service), and the public key is stored in the key/value store 120 (as described in greater detail below).

The WireGuard system elements (such as WireGuard node 115 of FIG. 1) fingerprint the devices being serviced (such as initiating device 105 of FIG. 1) via the 5-tuple (source IP address 207, destination IP address 208, source port 211, destination port 212, and protocol 206) along with the 32-bit sender index 218 (or receiver index found in packets sent from the responding device) found in the WireGuard message portion 215. The initiating device 105 uses the sender index 218 and the responding device 130 uses the receiver index. These index fields may rotate for security purposes.

Returning to FIG. 1A, router 110 sends packet 135 towards its intended destination (responding device 130). Router 110 may utilize Equal Cost Multipath (ECMP) routing to route the packet to WireGuard node 115. WireGuard node 115 intercepts packet 135 at interface 116 and obtains the 5-tuple (source IP address 207, destination IP address 208, source port 211, destination port 212, and protocol 206) along with the 32-bit sender index 218 (or receiver index) from the headers of packet 135, and obtains the public key (ephemeral 219) and the private key (encrypted static field 220) from the WireGuard message portion 215 of packet 135. As described in detail below, WireGuard node 115 establishes a WireGuard session and populates key/value store 120 using this information extracted from packet 135.

With reference now made to FIG. 1B, WTM 117 receives packet 135 because there is no WireGuard namespace set up on WireGuard node 115 to handle a connection for initiating device 105. WTM 117 determines that there is no namespace via the above-described 5-tuple, i.e., there is no namespace associated with the 5-tuple extracted from packet 135. In other words, the 5-tuple indicates a particular flow, and because there is no namespace associated with that 5-tuple, WTM 117 determines that a namespace associated with the 5-tuple is to be established for the flow. WTM 117 extracts the public key, which is the unencrypted ephemeral 219 in the WireGuard message portion 215 of the handshake initiation message contained in packet 135. This public key is used to unencrypt the data in the WireGuard packets sent over the WireGuard session once it is established.

WTM 117 creates a tenant namespace 140. A container is spun-up and a WireGuard interface 142 is created inside the namespace 140. An isolated virtual routing and forwarding (VRF) table, simply called a routing table, 144 is created for namespace 140. Then, a tunnel 146 is set up from the namespace 140 to the next-hop, possibly to other security services. A Geneve tunnel, which is described in draft-ietf-nvo3-geneve-08, may be used in example embodiments. Other types of tunnels include Virtual Extensible Local Area Network (VXLAN) tunnels, Generic Routing Encapsulation (GRE) tunnels, Multiprotocol Label Switching (MPLS) tunnels, and others known to the skilled artisan. The routing table 144 is updated to ensure that unencrypted packets flow over the tunnel 146 and to ensure encrypted packets flow over the WireGuard tunnel interface.

At this point, the WireGuard node 115 has the 5-tuple, along with the sender index 218 and the public key from the unencrypted ephemeral 219 of packet 135. These values tie the WireGuard session executed by namespace 140 to initiating device 105.

Figure 1C:
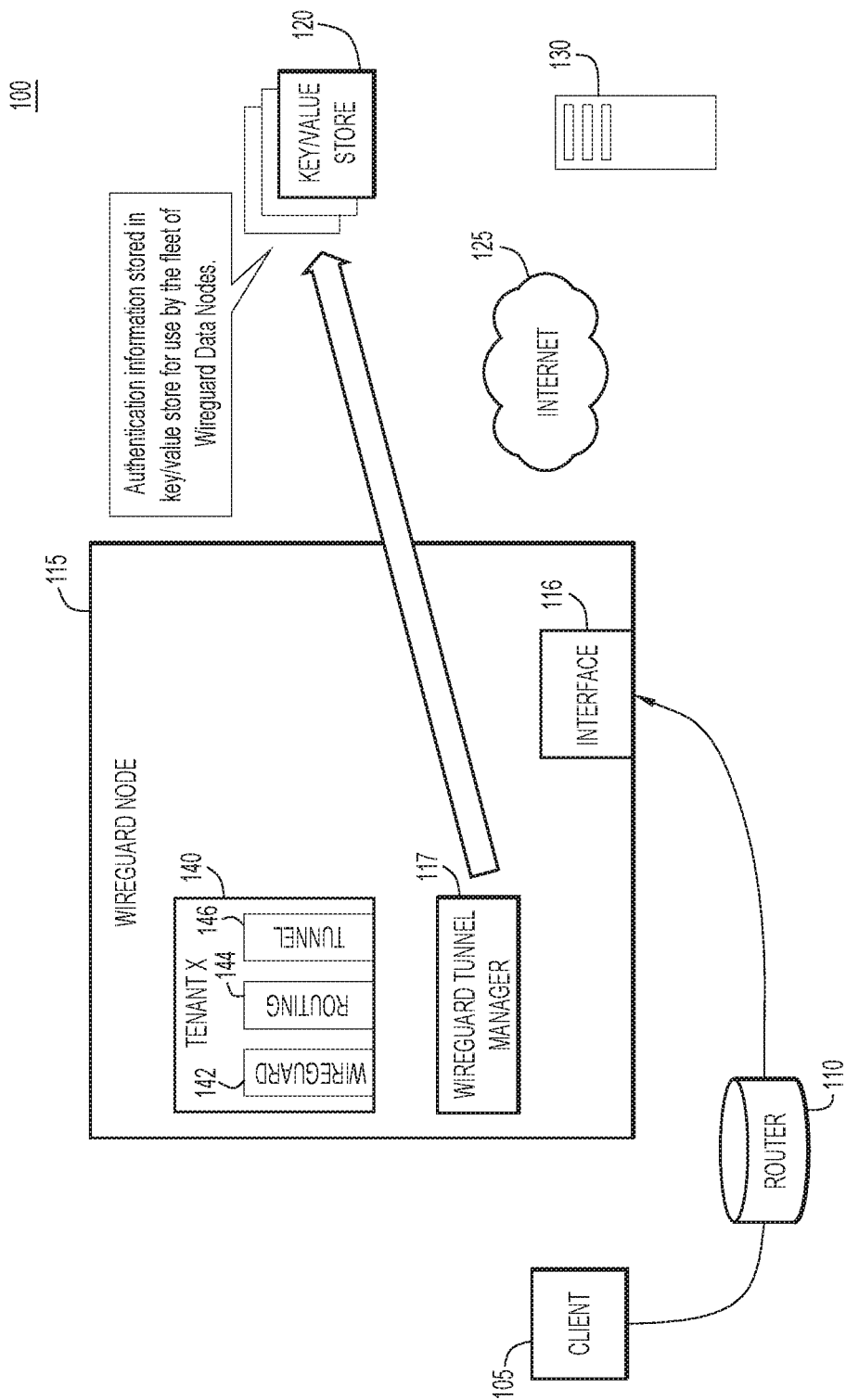
Figure 2:
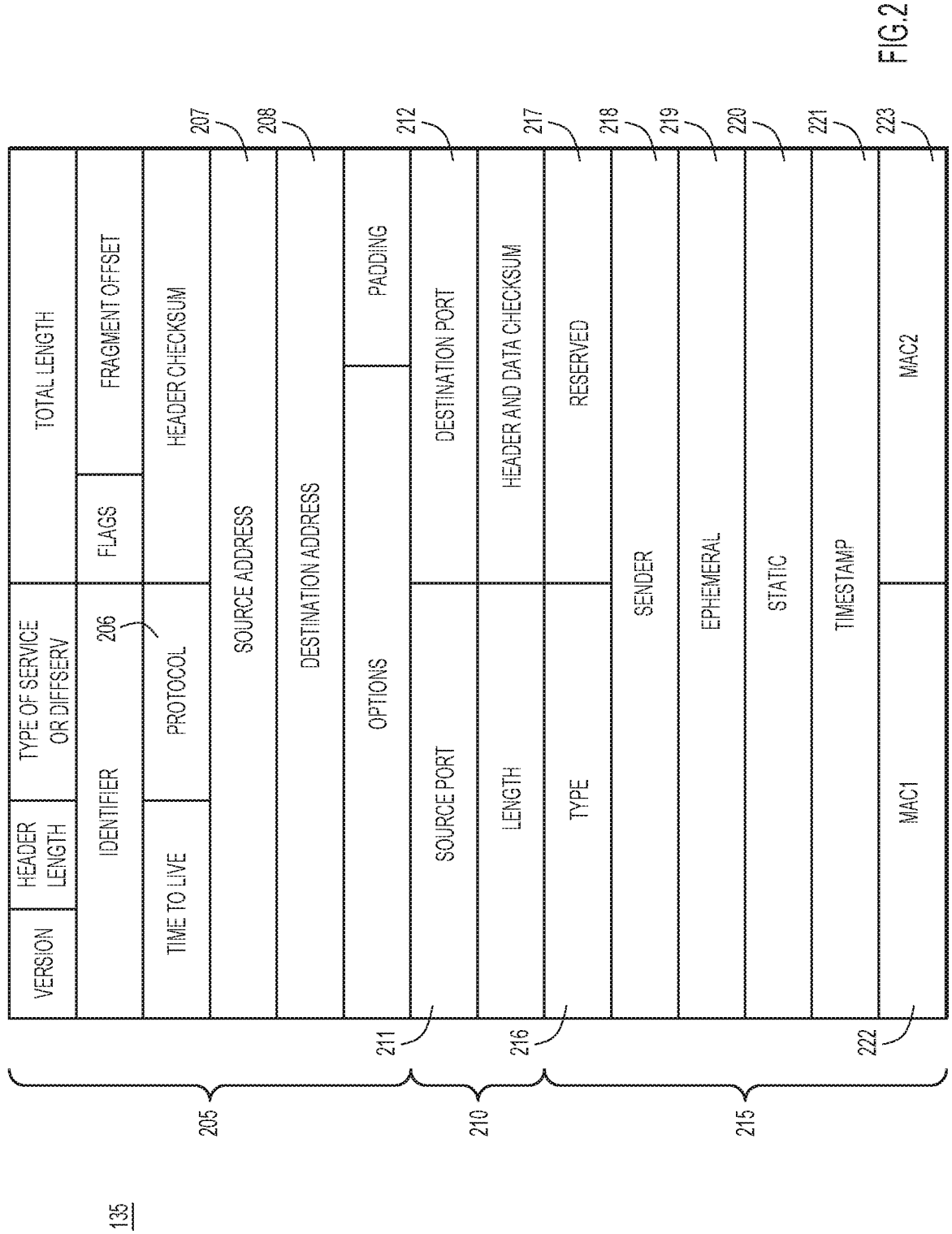
FIG. 2 illustrates a packet configured to initiate a VPN establishment handshake procedure, according to example embodiments.

Next, as shown in FIG. 1C, the authentication information is stored in the key/value store 120. This authentication information includes the encryption keys and the nonce created during the handshake process, which are used to encrypt and decrypt data sent via the WireGuard session executed by namespace 140. As shown in FIG. 1C, WTM 117 transmits data indicative of the authentication information to key/value store 120. WTM 117 also transmits the information that "fingerprints" the WireGuard session—the 5-tuple (source IP address 207, destination IP address 208, source port 211, destination port 212, and protocol 206) along with the 32-bit sender index 218 (or receiver index)—that may be used to recreate the WireGuard session, as described in greater detail below. The first and second MAC values 222 and 223 of packet 135 may also be transmitted to key/value store 120.

Initiating device 105 is now authenticated and its session informed is stored in the key/value store 120. The key/value store 120 is accessible to other WireGuard nodes (i.e., the "fleet" of WireGuard nodes deployed in network environment 100), facilitating the recreation of namespace 140 at other WireGuard nodes as described in greater detail below.

Figure 1D:
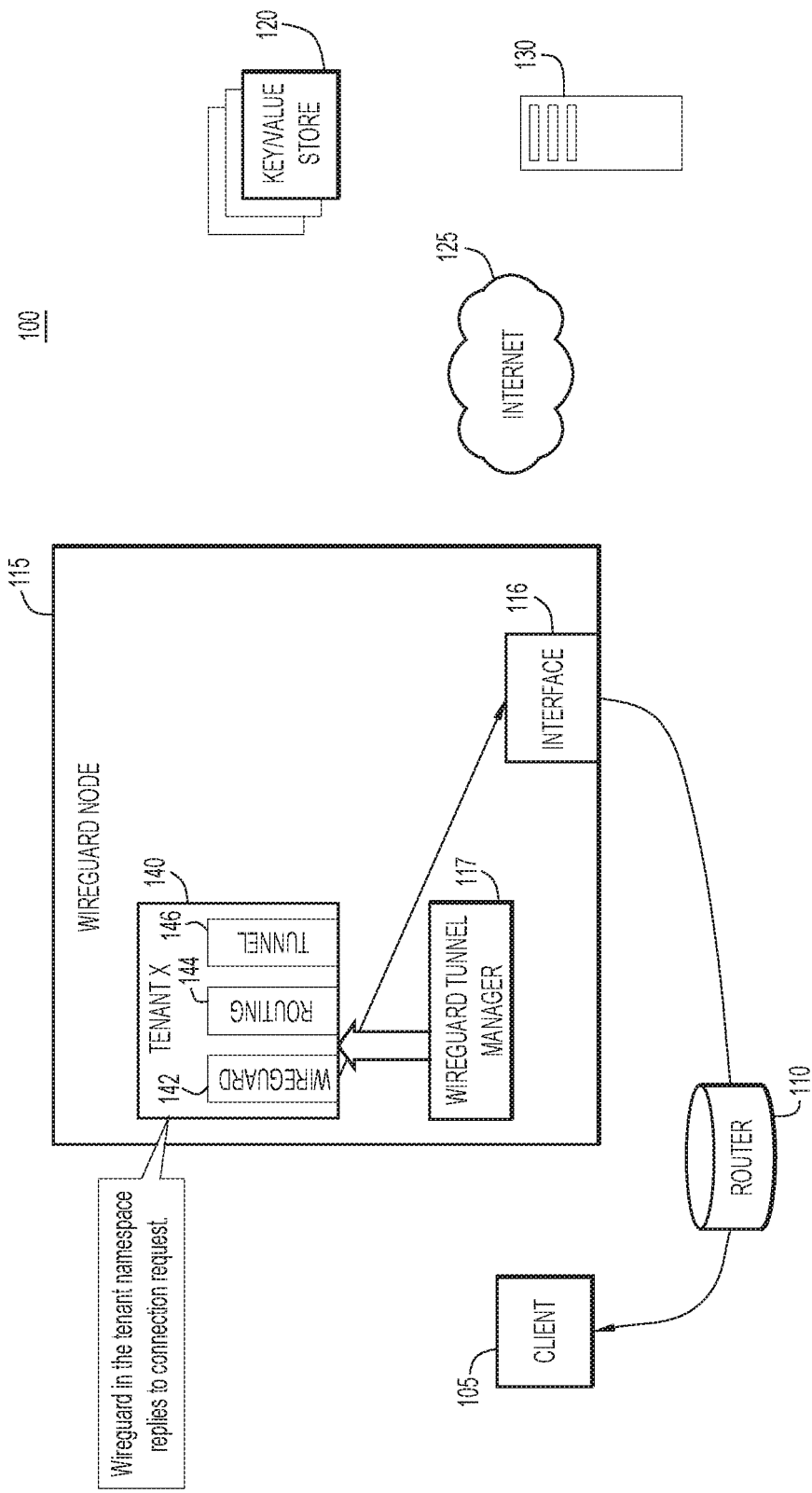

As shown in FIG. 1D, the WireGuard VPN session running inside namespace 140 authenticates with initiating device 105 by replying to packet 135 via a message sent to initiating device 105. According to the present example embodiment, the reply from WireGuard namespace 140 to initiating device 105 may be embodied as packet 300 illustrated in FIG. 3.

Figure 3:
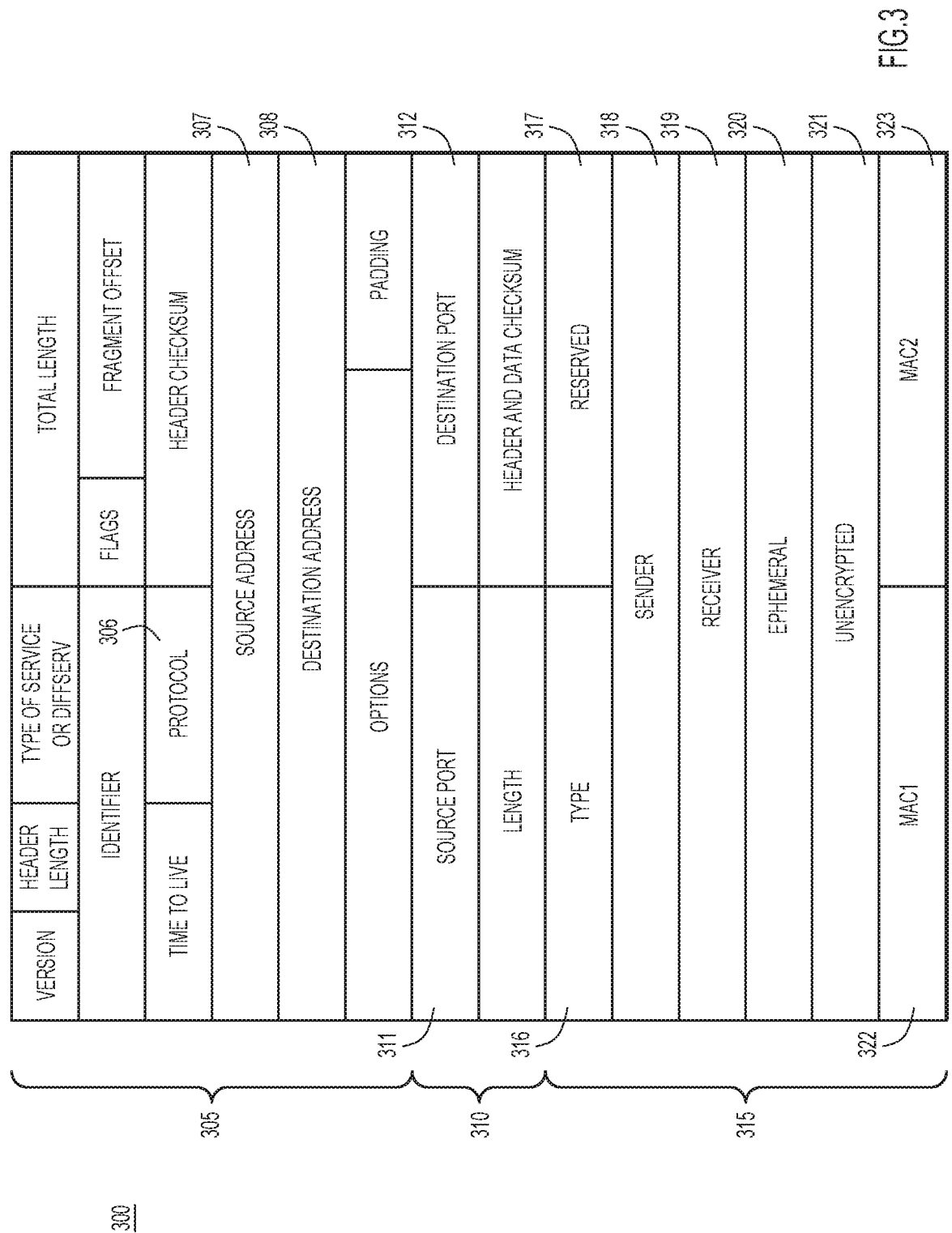
FIG. 3 illustrates a packet configured to respond to the packet illustrated in FIG. 2, according to example embodiments.

As illustrated in FIG. 3, packet 300 includes an IP header 305 and a UDP header 310 that are analogous to IP header 205 and UDP header 210 of packet 135 illustrated in FIG. 2. Accordingly, IP header 305 includes protocol field 306, source IP address 307 and destination IP address 308. UDP header 310 includes source port 311 and destination port 312. WireGuard message portion 315 differs from WireGuard message portion 215 of FIG. 2 in the following ways. First, the type field 316 indicates that packet 300 is a handshake response packet. Packet 300 also includes both a sender index 318 and a receiver index 319. Receiver index 319 may also be stored in key/value store 120. WireGuard message portion 315 also includes type field 317, ephemeral 320, unencrypted portion 321 and first and second MAC values 322 and 323.

With reference now made to FIG. 1E, initiating device 105 sends encrypted information as outbound traffic to responding device 130 via Internet 125. Specifically, the outbound traffic is received at interface 116 from router 110. Interface 116 transmits the traffic to namespace 140 where the traffic is transmitted to server device 130 via Internet 125 using the tunnel 146. The outbound traffic may pass through a cloud-based service chain 150 that may include a firewall, deep packet inspection (DPI), web proxy, and other services known to the skilled artisan. The reverse may happen for inbound traffic from the responding device 130 to initiating device 105.

WTM 117 will have access to namespace 140 so that if there are any changes to, for example, the protocol, the sender index, the first and second MAC values, or other parameters known to the skilled artisan, WTM 117 will identify these changes based upon the fingerprint to track the session and to ensure that the traffic is handled appropriately. Furthermore, WTM 117 will update key/value store 120 in response to any changes to the data stored therein to ensure that in the event that namespace 140 fails or is torn down, the data contained in key/value store 120 may be used to create a new namespace that is configured to service the traffic sent between initiating device 105 and responding device 130. For example, as WireGuard messages are exchanged, the WTM 117 will store additional state in the key/value store 120. This additional state may include the greatest timestamp received and updated first and second MAC values.

Figure 4A:
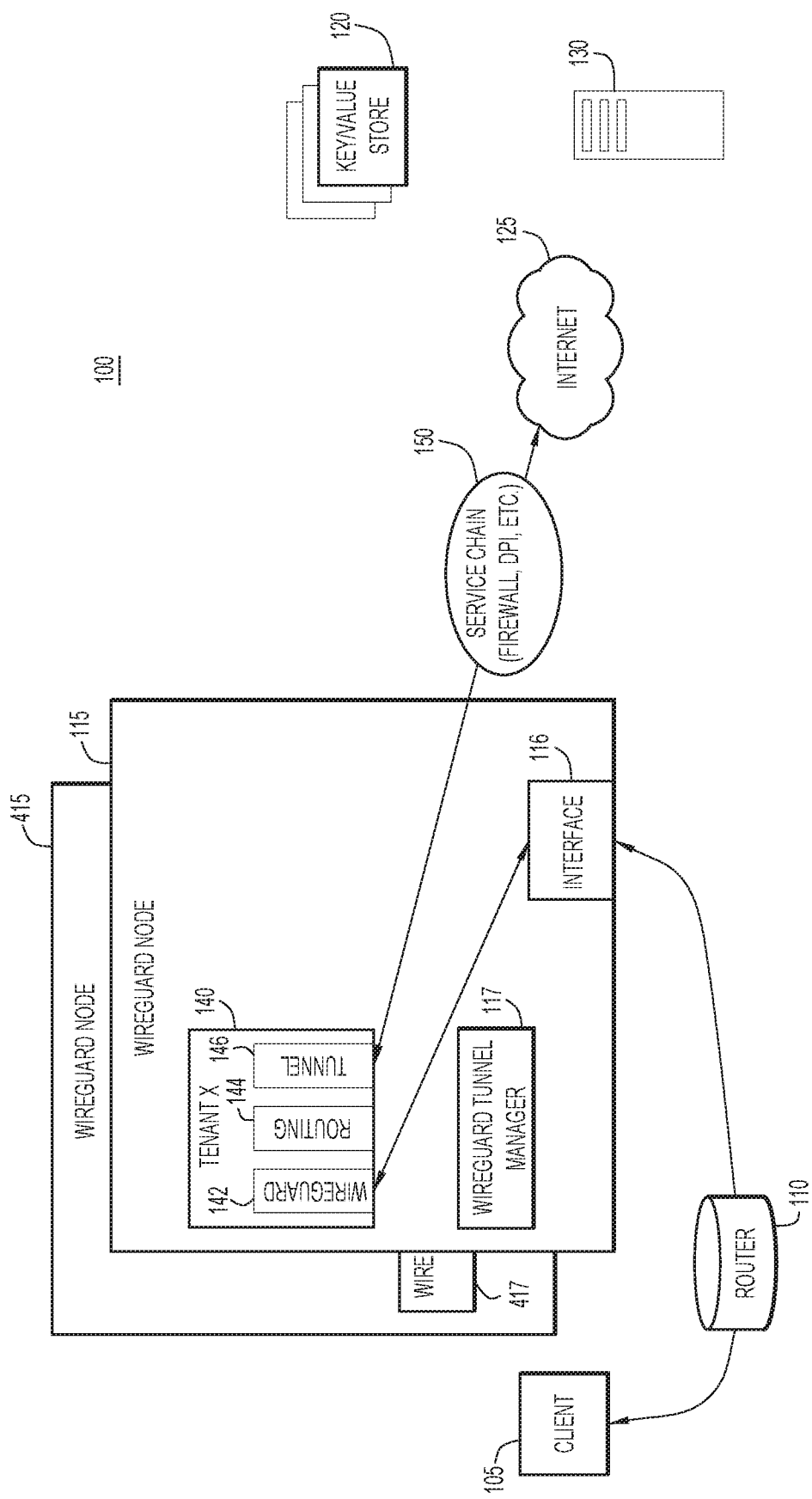
FIGS. 4A-4F illustrate an operational flow of a VPN node failover process, according to example embodiments.

Reference is now made to FIGS. 4A-4F for a description of a failover scenario. As shown in FIG. 4A, in a typical deployment, there are multiple WireGuard nodes. FIG. 4A illustrates two such nodes, WireGuard node 115, which is operating as illustrated in FIG. 1E and servicing traffic between client device 105 (which is no longer being referred to as the initiating device because the WireGuard session has been established) and server device 130 (which is no longer being referred to a responding device), and WireGuard node 415. Both of WireGuard nodes 115 and 415 are stateless. A described above with reference to FIGS. 1A-1E, cryptographic information and client information is stored in key/value store 120 that is available to reconstruct the WireGuard session and the tunnel between client device 105 and server device 130 on any node. What follows is a description of how the techniques of the present disclosure handle failover of a VPN node. The specific example described with reference to FIGS. 4A-4F implements the VPN node failover techniques using WireGuard.

Figure 4B:
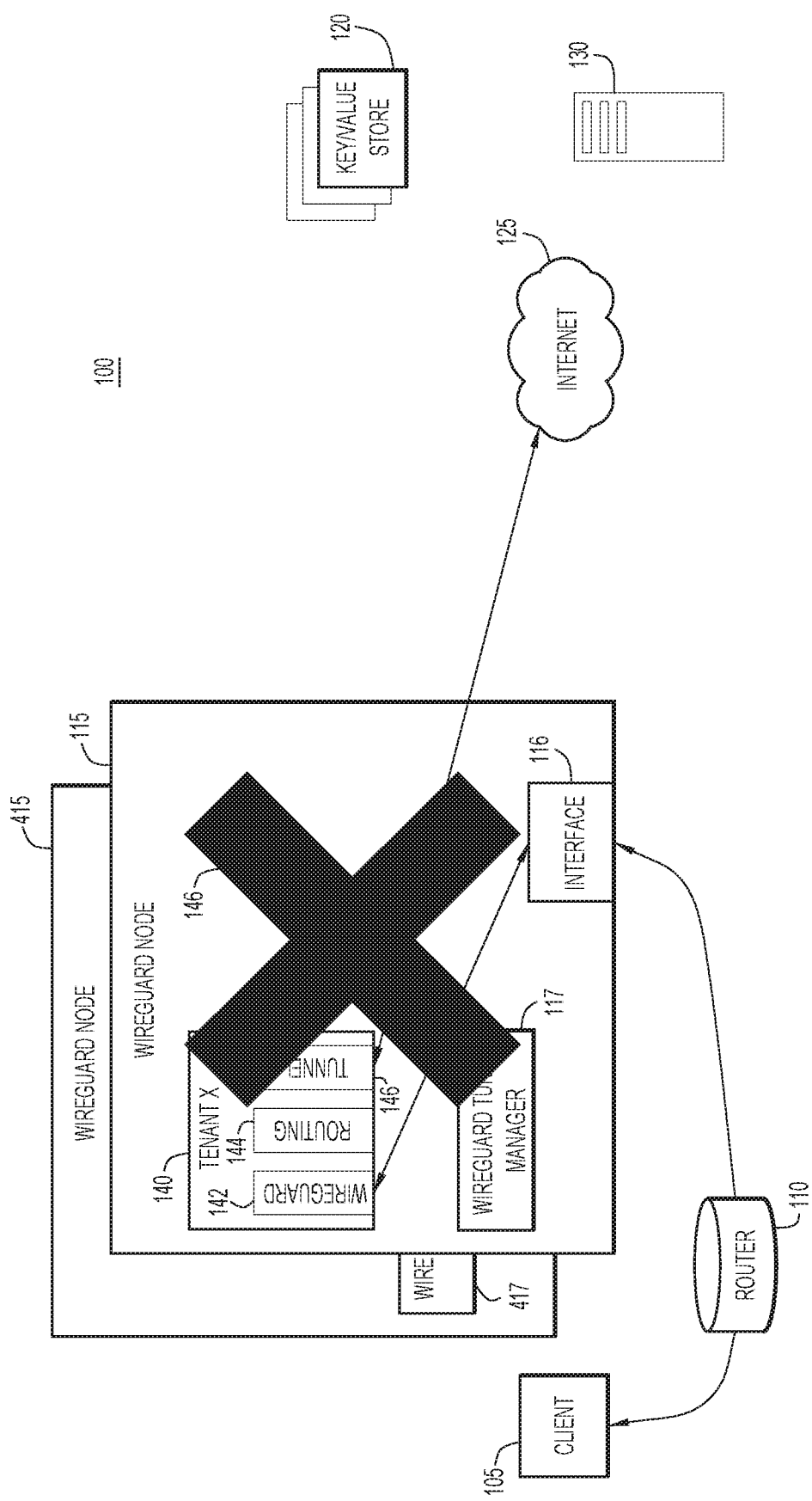

In FIG. 4B, WireGuard node 115 is rolled, stops functioning or otherwise stops handling traffic. While the example of FIG. 4B shows the entirety of WireGuard node 115 leaving service, the techniques described below also apply to situations in which namespace 140 fails or is removed from service while WireGuard node 115 continues to operate. Accordingly, after the WireGuard node 115 (or namespace 140) is removed from service, there is no longer an active WireGuard VPN session servicing the traffic between client device 105 and server device 130.

Figure 4C:
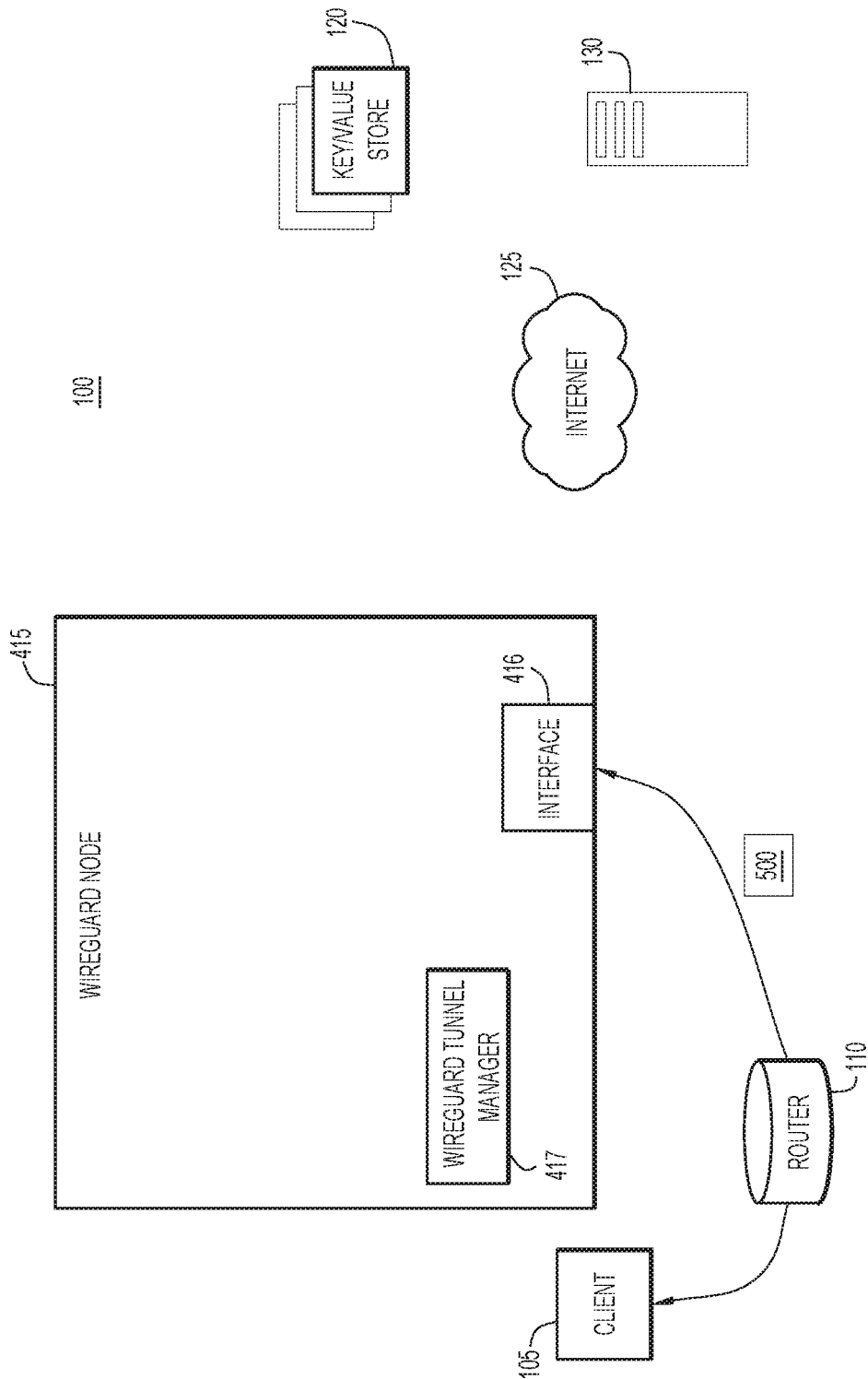

In FIG. 4C, the WTM 417 on WireGuard node 415 receives traffic in the form of packet 500 from client device 105. For example, edge data center router 110 receives packet 500 from client device 105 and applies ECMP routing to packet 500, which results in edge data center router 110 sending packet 500 to WireGuard node 415 now that WireGuard node 115 is no longer in service.

Figure 5:
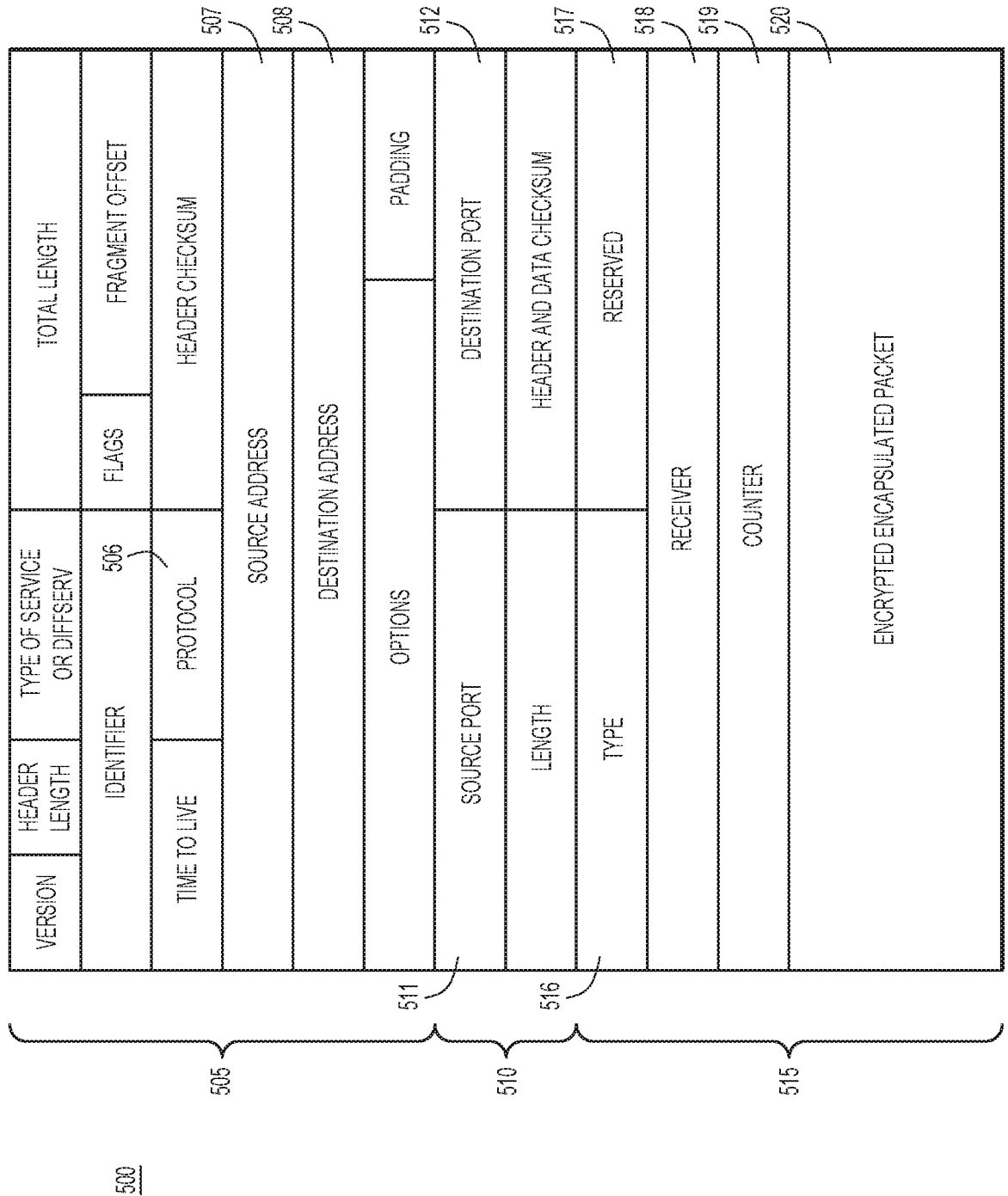
FIG. 5 illustrates a packet configured to transmit data through an established VPN session, according to example embodiments.

The packet 500 that WireGuard node 415 receives may contain data as illustrated in packet 500 of FIG. 5. The IP header 505 and UDP header 510 are similar to the IP headers and UDP headers illustrated in FIGS. 2 and 3. Accordingly, IP header 505 includes protocol field 506, source IP address 507 and destination IP address 508. UDP header 510 includes source port 511 and destination port 512. WireGuard message portion 515, on the other hand, contains different data because packet 500 is used, not to execute a WireGuard handshake, but to transmit data between client device 105 and server device 130. Accordingly, WireGuard message portion 515 includes a type field 516 that indicates that the packet is a data packet, a reserved portion 517, a receiver index 518, a counter 519, and message data 520.

Figure 4D:
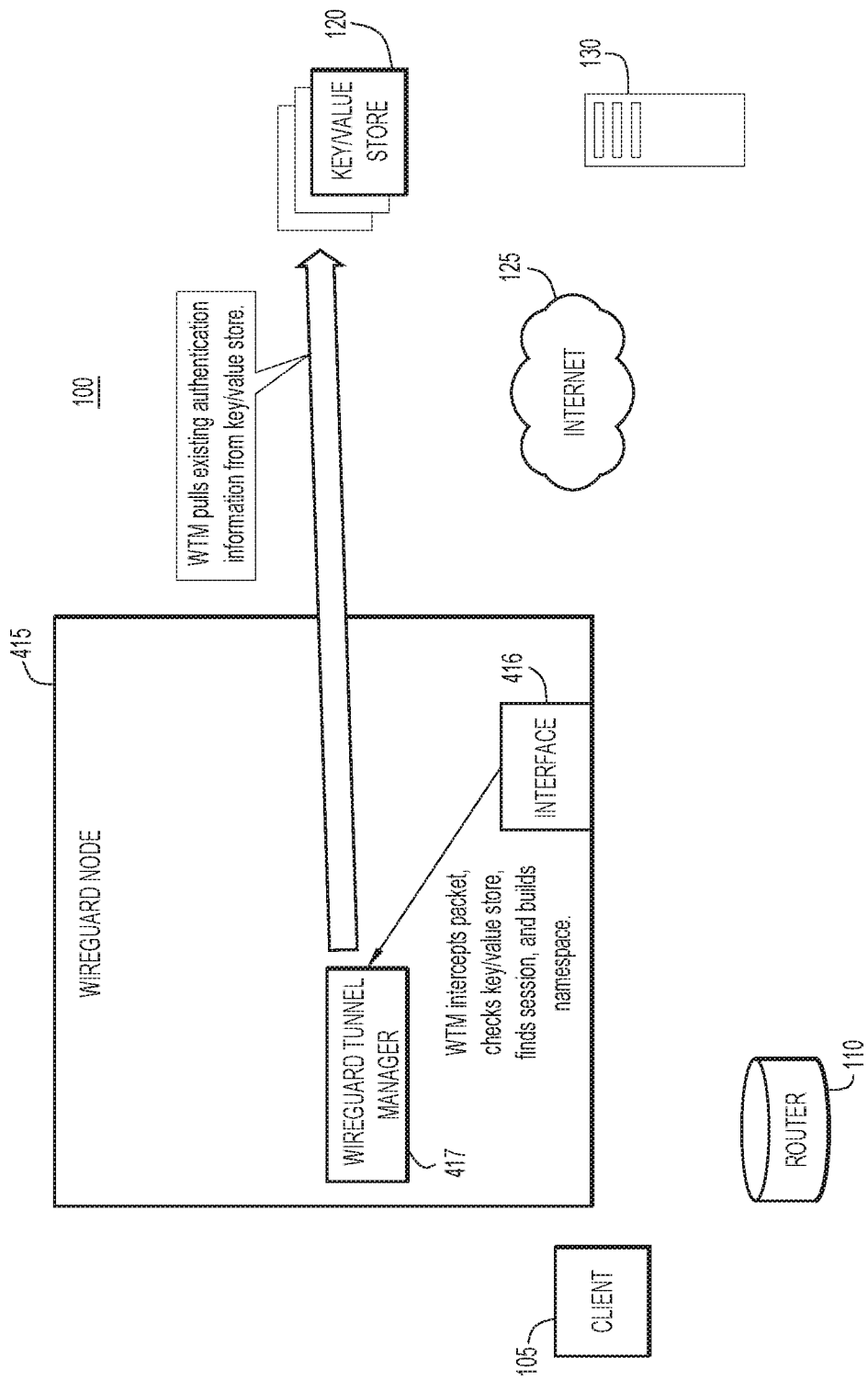

Upon receipt of packet 500 at interface 416 of WireGuard node 415, packet 500 is transmitted to WTM 417, as illustrated in FIG. 4D. WTM 417 extracts the 5-tuple and receiver index 518 from packet 500 to find the session in the key/value store 120. In other words, WTM 417 searches key/value store 120 using the 5-tuple and receiver index 518 to retrieve the data from key/value store 120 that will allow WTM 417 to construct a namespace, including the appropriate interfaces, routing table and keys, that will allow WireGuard node 415 to service the VPN session between client device 105 and server device 130 in the same manner as now inoperable WireGuard node 115 while ensuring that the failover process is transparent to client device 105 and server device 130. In other words, WireGuard node 415 reestablishes the VPN session that was previously implemented through WireGuard node 115 through the use of the data stored at key/value store 120. This accessing of key/value store 120 is also illustrated in FIG. 4D.

Figure 4E:
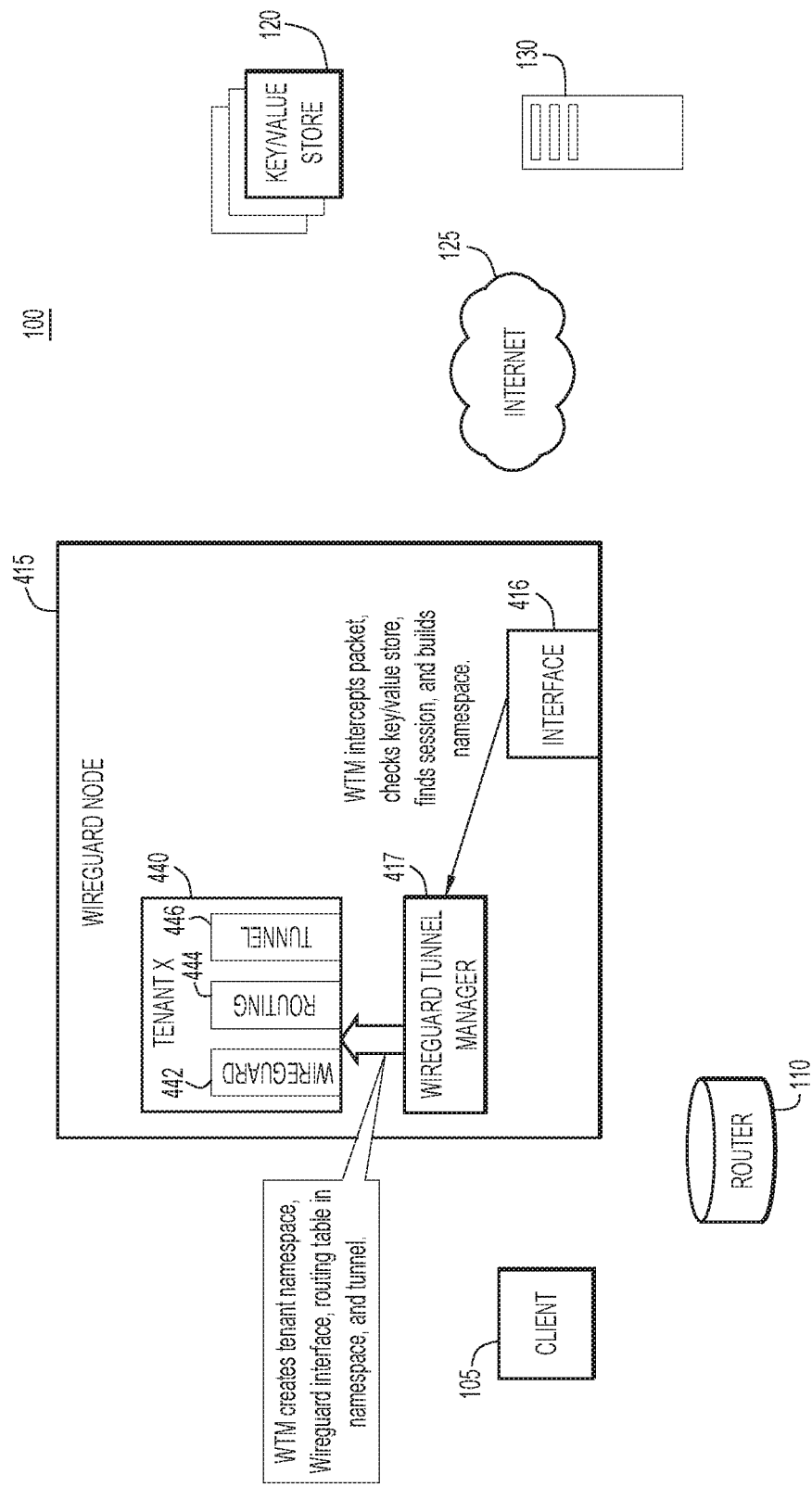
Figure 4F:
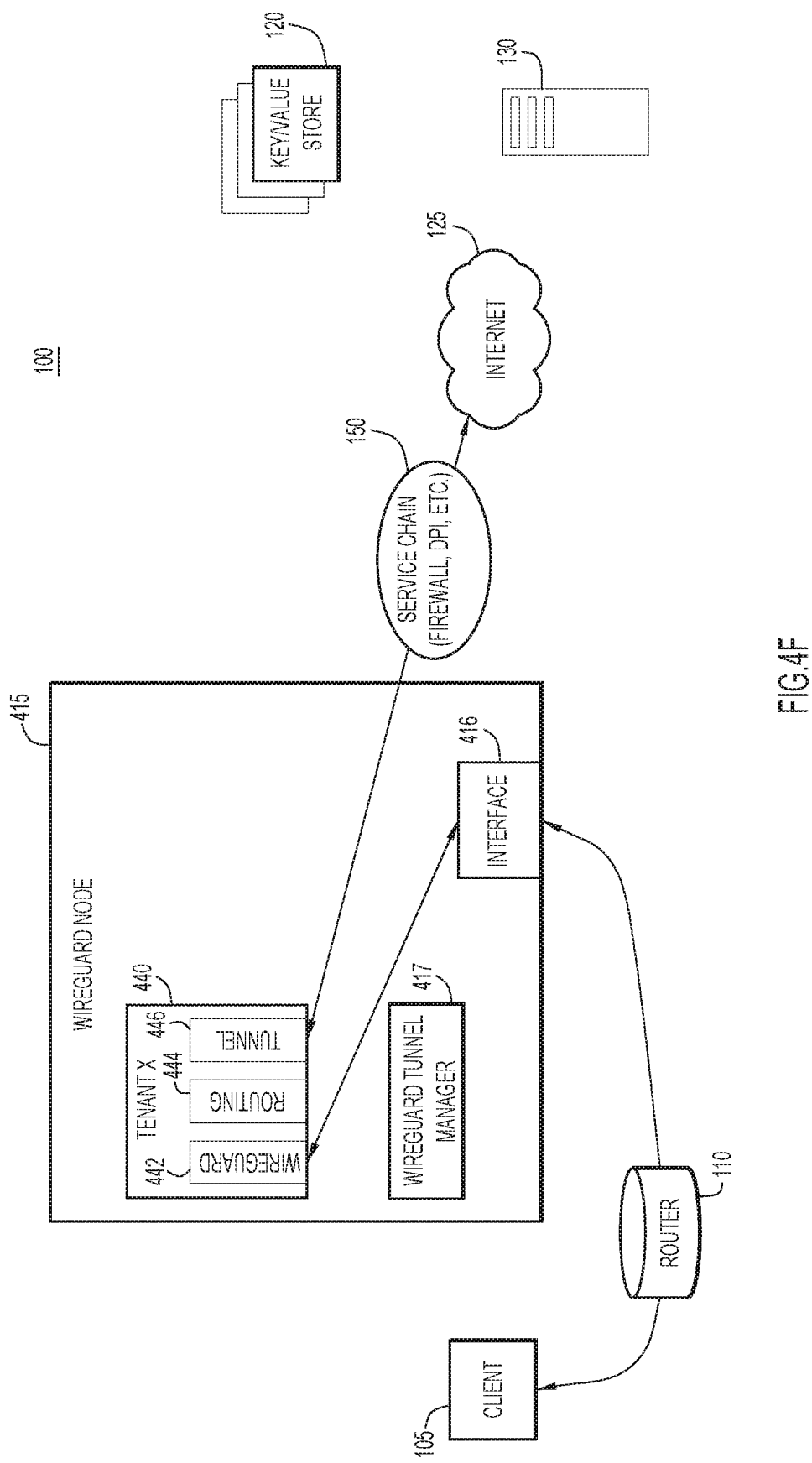

As shown in FIG. 4E, WTM 417 creates the namespace 440, using the authentication information obtained from the key/value store 120. WTM 417 essentially recreates namespace 140, routing table 144, WireGuard interface 142 and tunnel 146 from WireGuard node 115 of FIG. 4A as namespace 440, routing table 444, WireGuard interface 442 and tunnel 446 executing on WireGuard node 415. Client device 105 can now send encrypted information and use the Internet 125, as shown in FIG. 4F. Like in the traffic sent from client device 105 to server device 130 in FIG. 4A, the traffic sent in FIG. 4F may pass through a cloud-based service chain 150 that may include a firewall, DPI, web proxy, and possibly other services. The reverse happens for inbound traffic from the server device 130 to client device 105.

The foregoing presents techniques for dynamic setup and creation of WireGuard endpoints for clients using hybrid-Anycast and ECMP. WireGuard session information is stored in a key/value store, allowing for the operation of WireGuard nodes as cattle rather than pets. Dynamically failing WireGuard sessions between different WireGuard nodes is achieved by storing WireGuard information in a key/value store. Moreover, the techniques of the present disclosure enable dynamically chaining WireGuard namespaces to a cloud delivered firewall and other services.

Figure 6:
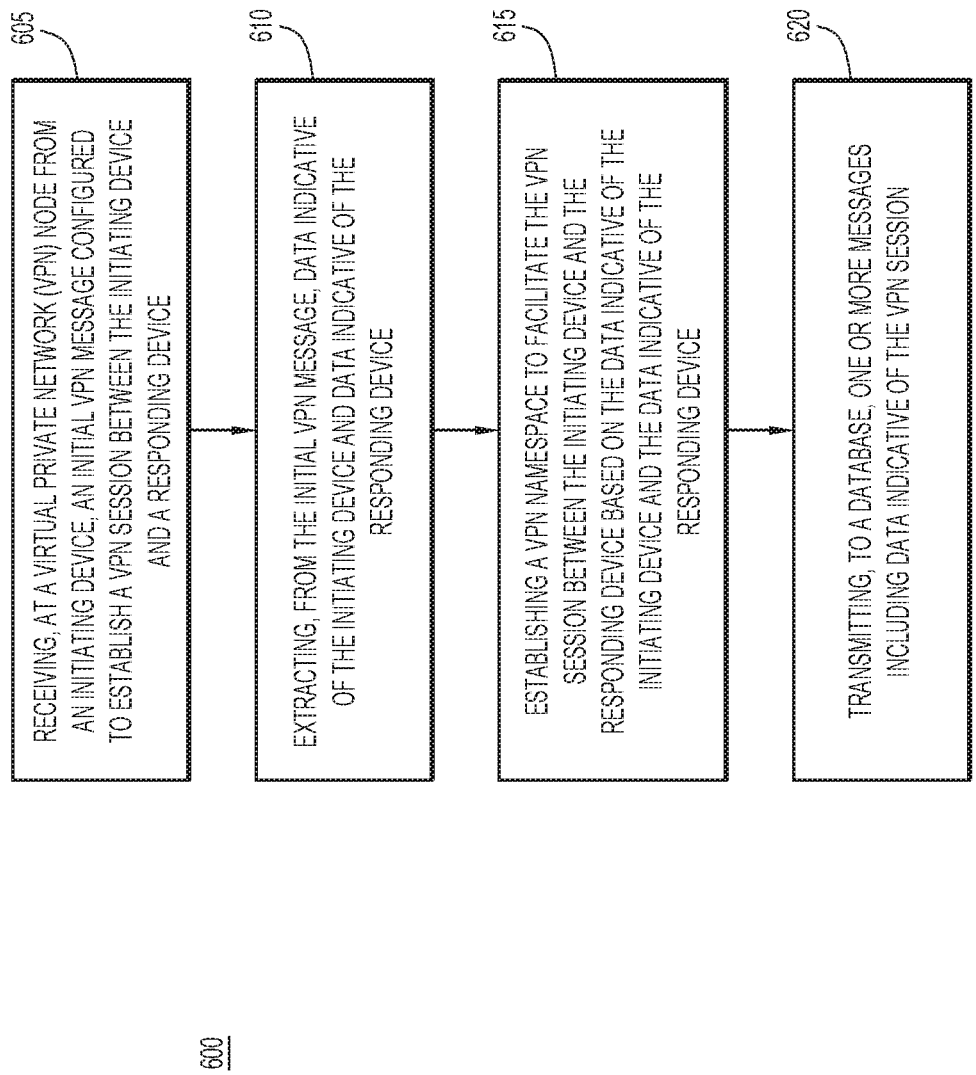
FIG. 6 illustrates a flowchart providing a process flow for establishing a VPN session, according to example embodiments.

With reference now made to FIG. 6, depicted therein is a flowchart 600 illustrating a process flow for establishing a VPN session according to the techniques of the present disclosure. Accordingly, the process illustrated in FIGS. 1A-1E may be a specific example of the process illustrated in flowchart 600.

Flowchart 600 begins in operation 605 where a VPN node receives an initial VPN message. The initial VPN message is received from an initiating device and it is configured to establish a VPN session between the initiating device and a responding device. According to specific example embodiments of operation 605, the initial VPN message may be a message configured to initiate a WireGuard handshake procedure, such as packet 135 of FIG. 2. Also according to specific example embodiments, the VPN node may be embodied as a WireGuard VPN node and the VPN session to be established may be a WireGuard VPN session.

In operation 610, data indicative of the initiating device and data indicative of the responding device are extracted from the initial VPN message. According to specific examples, the data indicative of the initiating device and the responding device may be embodied as the 5-tuple data and the sender or receiver indexes described above with reference to FIGS. 1A-1E and illustrated in FIG. 2.

In operation 615, a VPN namespace is established to facilitate the VPN session between the initiating device and the responding device. The VPN namespace is established based upon the data indicative of the initiating device and the data indicative of the responding device. According to specific examples of operation 615, the establishment of the VPN namespace may include the establishment of a namespace such as namespace 140 of FIGS. 1A-1E, including one or more of the components that execute within namespace 140, as described above.

Finally, in operation 620, one or more messages that include data indicative of the VPN session are transmitted to a database. The transmission of the data indicative of the VPN session may be used to recreate the VPN session in response to failed or torn down VPN namespaces, as described above with reference to FIGS. 4A-4F, and as described below with reference to FIG. 7. The database to which the data indicative of the VPN session is transmitted may be embodied as a high performance and/or lightweight database, such as the key/value store 120 of FIGS. 1A-1E.

Operations 605-620 may be implemented at a VPN node, such as a WireGuard VPN node, and more specifically, at a WTM of a WireGuard VPN node, such as WTM 117 of FIGS. 1A-1E. Furthermore, the process flow illustrated in flowchart 600 may include additional operations, such as the sending of data traffic between the initiating device and the responding device via the established VPN session, and/or updating the database in response to changes to the data indicative of the VPN session that may occur during the VPN session. Additionally, the data transmitted to the database may include the transmission of additional data, such as encryption keys and nonces, as described above with reference to FIGS. 1A-1E.

With reference now made to FIG. 7, depicted therein is a flowchart 700 illustrating a process flow for recreating a VPN session according to the techniques of the present disclosure. Accordingly, the process illustrated in FIGS. 4A-4F may be a specific example of the process illustrated in flowchart 700.

Flowchart 700 begins in operation 705 where a VPN node receives traffic sent from a sending device to a receiving device. This traffic may be received at the VPN node subsequent to the failure of a VPN node that previously provided a VPN session for the traffic sent between the sending device and the receiving device. According to other example embodiments, the traffic may be received at the VPN node after a VPN session that previously executed on the VPN node was torn down due to inactivity over the VPN session. The VPN node may be embodied as a WireGuard VPN node, such as one or more of VPN nodes 115 and 415 of FIG. 4A.

In operation 710, it is determined that the VPN node does not contain a VPN namespace configured to facilitate a VPN session between the sending device and the receiving device. For example, the VPN node may extract the above-described 5-tuple, sender index or receiver index from the traffic. Based on this extracted information, the VPN node may determine that there is no corresponding VPN namespace executing on the VPN node.

In operation 715, one or more messages are received from a database that include data indicative of the VPN session. The messages containing the data indicative of the VPN session may be received from a high performance and/or light weight database, such as key/value store 120 of FIGS. 4A-4F. The data contained in the one or more messages received in operation 715 may include the data that was transmitted to the database in operation 620 of FIG. 6. Accordingly, the one or more messages may contain data indicative of the encryption keys and nonces used in the encryption provided by the VPN session, and the MAC values used in the VPN session.

In operation 720, the VPN namespace is established to facilitate the VPN session between the sending device and the receiving device. The establishment of the VPN namespace is based upon the data indicative of the VPN session received from the database. The establishment of the VPN namespace may include the establishment of a namespace such as namespace 440 of FIGS. 4E-4F, including one or more of the components that execute within namespace 440, as described above.

Finally, in operation 725, the traffic is transmitted to the receiving device via the VPN session.

FIG. 8 illustrates a hardware block diagram of a computing device 800 that may perform the functions of any of the servers or computing entities referred to herein in connection with FIGS. 1A-1E and 4A-4F. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the VPN Software 817 (e.g., WireGuard VPN software) may be stored in memory 816 or persistent storage 818 for execution by processor(s) 814.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, provided for herein are techniques for building a global hybrid anycast VPN service, including WireGuard VPN services. The techniques of the present disclosure make use of a high performance and/or lightweight database, such as a key/value store, to store VPN session information. The techniques of the present disclosure allow VPN nodes to dynamically provision existing VPN tunnels on any VPN node based on ECMP sending client packets from edge router to a set of VPN nodes.

According to specific embodiments of the techniques provided for herein are methods that include: receiving, at a Virtual Private Network (VPN) node from an initiating device, an initial VPN message configured to establish a VPN session between the initiating device and a responding device; extracting, from the initial VPN message, data indicative of the initiating device and data indicative of the responding device; establishing a VPN namespace to facilitate the VPN session between the initiating device and the responding device based on the data indicative of the initiating device and the data indicative of the responding device; and transmitting, to a database, one or more messages comprising data indicative of the VPN session.

Also according to the techniques provided for herein are methods that include: receiving, at a Virtual Private Network (VPN) node, traffic sent from a sending device to a receiving device; determining that the VPN node does not contain a VPN namespace configured to facilitate a VPN session between the sending device and receiving device; receiving, from a database via one or more messages, data indicative of the VPN session; establishing the VPN namespace to facilitate the VPN session between the sending device and the receiving device based on the data indicative of the VPN session; and transmitting the traffic to the receiving device via the VPN session.

The techniques described herein also provide for one or more tangible, non-transitory computer readable media encoded with instructions. The instructions, when executed by one or more processors, are operable to cause the one or more processors to: receive, at a Virtual Private Network (VPN) node from an initiating device, an initial VPN message configured to establish a VPN session between the initiating device and a responding device; extract, from the initial VPN message, data indicative of the initiating device and data indicative of the responding device; establish a VPN namespace to facilitate the VPN session between the initiating device and the responding device based on the data indicative of the initiating device and the data indicative of the responding device; and transmit, to a database, one or more messages comprising data indicative of the VPN session.

The techniques of the present disclosure also provide for apparatuses that include one or more processors and/or one or more network interfaces. The one or more processors are configured to: receive, at a Virtual Private Network (VPN) node from an initiating device, an initial VPN message configured to establish a VPN session between the initiating device and a responding device; extract, from the initial VPN message, data indicative of the initiating device and data indicative of the responding device; establish a VPN namespace to facilitate the VPN session between the initiating device and the responding device based on the data indicative of the initiating device and the data indicative of the responding device; and transmit, to a database, one or more messages comprising data indicative of the VPN session.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, at a Virtual Private Network (VPN) node from an initiating device, an initial VPN message configured to establish a VPN session between the initiating device and a responding device;
    extracting, from the initial VPN message, data indicative of the initiating device and data indicative of the responding device;
    establishing a VPN namespace to facilitate the VPN session between the initiating device and the responding device based on the data indicative of the initiating device and the data indicative of the responding device; and
    transmitting, to a database, one or more messages comprising data indicative of the VPN session obtained from a 5-tuple provided in the initial VPN message, wherein the 5-tuple includes a protocol field.

2. The method of claim 1, wherein the VPN session comprises a WireGuard VPN session.

3. The method of claim 1, wherein the data indicative of the initiating device comprises an Internet Protocol address of the initiating device and a User Datagram Protocol port of the initiating device; and
    wherein the data indicative of the responding device comprises an Internet Protocol address of the responding device and a User Datagram Protocol port of the responding device.

4. The method of claim 1, wherein the data indicative of the VPN session comprises one or more encryption keys.

5. The method of claim 1, further comprising transmitting data traffic between the initiating device and the responding device via the VPN session.

6. The method of claim 1, further comprising:
    tearing down the VPN session;
    receiving data traffic from the initiating device or the responding device;
    receiving, from the database, the data indicative of the VPN session;
    reestablishing the VPN session; and
    transmitting the data traffic via the VPN session.

7. The method of claim 1, wherein the database comprises a key/value store.

8. A method comprising:
    receiving, at a Virtual Private Network (VPN) node, traffic sent from a sending device to a receiving device;
    determining that the VPN node does not contain a VPN namespace configured to facilitate a VPN session between the sending device and receiving device;
    receiving, from a database via one or more messages, data indicative of the VPN session obtained from a 5-tuple provided in an initial VPN message, wherein the 5-tuple includes a protocol field;
    establishing the VPN namespace to facilitate the VPN session between the sending device and the receiving device based on the data; and
    transmitting the traffic to the receiving device via the VPN session.

9. The method of claim 8, wherein VPN session comprises a WireGuard VPN session.

10. The method of claim 8, wherein the database comprises a key/value store.

11. The method of claim 8, wherein receiving the first data indicative of the VPN session comprises receiving one or more encryption keys.

12. The method of claim 8, wherein determining that the VPN node does not contain the VPN namespace configured to facilitate the VPN session comprises determining a source Internet Protocol address, a destination Internet Protocol address, a source User Datagram Protocol port and a destination User Datagram Protocol port from the traffic.

13. The method of claim 12, wherein receiving, from the database via the one or more messages, the first data indicative of the VPN session comprises transmitting data indicative of the source Internet Protocol address, the destination Internet Protocol address, the source User Datagram Protocol port and the destination User Datagram Protocol port to the database.

14. One or more tangible, non-transitory computer readable media encoded with instructions, wherein the instructions, when executed by one or more processors, are operable to cause the one or more processors to:
    receive, at a Virtual Private Network (VPN) node from an initiating device, an initial VPN message configured to establish a VPN session between the initiating device and a responding device;
    extract, from the initial VPN message, data indicative of the initiating device and data indicative of the responding device;
    establish a VPN namespace to facilitate the VPN session between the initiating device and the responding device based on the data indicative of the initiating device and the data indicative of the responding device; and
    transmit, to a database, one or more messages comprising data indicative of the VPN session obtained from a 5-tuple provided in the initial VPN message, wherein the 5-tuple includes a protocol field.

15. The one or more tangible, non-transitory computer readable media of claim 14, wherein the VPN session comprises a WireGuard VPN session.

16. The one or more tangible, non-transitory computer readable media of claim 14, wherein the data indicative of the initiating device comprises an Internet Protocol address of the initiating device and a User Datagram Protocol port of the initiating device; and wherein the data indicative of the responding device comprises an Internet Protocol address of the responding device and a User Datagram Protocol port of the responding device.

17. The one or more tangible, non-transitory computer readable media of claim 14, wherein the data indicative of the VPN session comprises one or more encryption keys.

18. The method of claim 1, wherein the data indicative of the VPN session is obtained from an unencrypted ephemeral field and an encrypted static field of the initial VPN message.

19. The method of claim 1, wherein establishing the VPN namespace includes creating an interface inside the VPN namespace, generating a routing table, and setting up a tunnel to a next hop for the VPN namespace.

20. The method of claim 1, wherein the data indicative of the initiating device includes a first User Datagram Protocol port of the initiating device and the data indicative of the responding device includes a second User Datagram Protocol port of the responding device.

* * * * *

UNITED STATES PATENT AND TRADEMARK OFFICE
CERTIFICATE OF CORRECTION

PATENT NO. : 11,463,410 B2
APPLICATION NO. : 16/845753
DATED : October 4, 2022
INVENTOR(S) : Kyle Mestery et al.

It is certified that error appears in the above-identified patent and that said Letters Patent is hereby corrected as shown below:

In the Claims

Claim 11, Column 16, Line 30, please replace "receiving the first data" with --receiving the data--

Claim 13, Column 16, Lines 40-41, please replace "the first data indicative" with --the data indicative--

Signed and Sealed this
Twenty-seventh Day of December, 2022

Katherine Kelly Vidal
*Director of the United States Patent and Trademark Office*